UNITED STATES PATENT OFFICE.

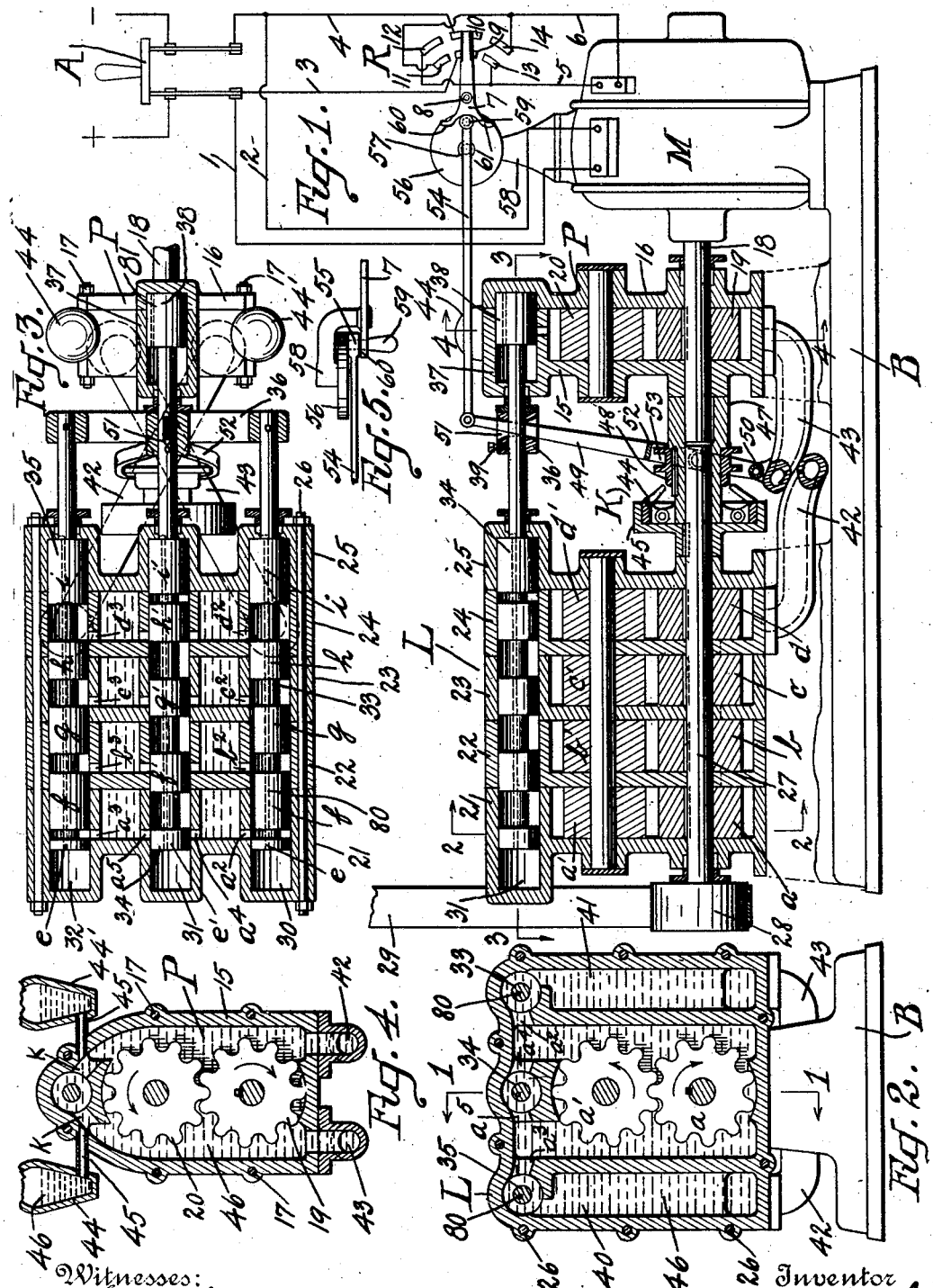

AUGUST SUNDH, OF YONKERS, NEW YORK.

HYDRAULIC VARIABLE GEAR FOR POWER TRANSMISSION.

986,780.  Specification of Letters Patent.  Patented Mar. 14, 1911.

Application filed June 28, 1909. Serial No. 504,636.

*To all whom it may concern:*

Be it known that I, AUGUST SUNDH, a citizen of the United States, residing at Yonkers, in the county of Westchester and State of New York, have invented a new and useful Improvement in Hydraulic Variable Gear for Power Transmission, of which the following is a specification.

My invention relates to mechanism for transmitting power by fluid pressure from a driving element to a driven element, and comprises means for effecting a variation in the speed and torque of the driven element.
The invention comprises the combination of a pump adapted to be operated by a prime mover or other driving element, and a motor driven by fluid supplied from the pump, the motor being adapted to be connected to any mechanism that it is desired to operate.

One of the objects of the invention is to provide simple and efficient power transmitting mechanism of the character above indicated, and in which the means for controlling the speed of the mechanism may be operated with ease and without danger of damage to the mechanism from too sudden operation of the controlling devices.
Other objects of the invention will appear hereinafter, the scope of the invention being defined in the appended claims, in which are set forth the novel combinations of elements.
In the accompanying drawings in which is illustrated an embodiment of the invention, Figure 1 is a sectional elevation of the pump and fluid motor, and also showing diagrammatically the electric driving motor and controlling mechanism therefor; Fig. 2 is a sectional elevation view of the fluid motor taken substantially on the plane indicated by the line 2—2 of Fig. 1; Fig. 3 is a sectional plan view taken on the line 3—3 of Fig. 1; Fig. 4 is a sectional elevation of the pump taken substantially on the line 4—4 of Fig. 1; Fig. 5 is a detail view of the controlling mechanism.

The general arrangement of parts comprises a prime mover here shown as an electric motor M, a pump P connected to be driven by the motor M, and a motor L adapted to be driven by fluid supplied from the pump P.
The motor M is adapted to receive current from any suitable source of current supply through the positive and negative mains designated + and —, respectively. The main line switch A connects these mains to conductors 1 and 2 leading to the field windings of the motor, and conductors 3 and 4 leading to the reversing switch R. The conductors 3 and 4 are adapted to be connected through the reversing switch R to conductors 5 and 6 leading to the commutator or rotor of the motor. The reversing switch comprises a lever 7 pivoted at 8 and carrying insulated switch contacts 9 and 10 connected respectively to the conductors 3 and 4. When the lever 7 is rotated to carry the contacts 9 and 10 upward they engage respectively with stationary contacts 11 and 12 connected to the conductors 6 and 5. When the contacts 9 and 10 move downward they engage stationary contacts 13 and 14 connected respectively with the conductors 5 and 6. The electric motor M is mounted upon a base B on which are also mounted the pump P and a fluid motor L. The pump P comprises a casing consisting of sections 15 and 16 secured together by means of bolts or rivets 17 (see Fig. 4). The shaft 18 of the motor M extends through the pump casing and has keyed thereto a pump gear 19 which meshes with a similar pump gear 20 journaled in the upper part of the casing.

The fluid motor L comprises a case formed in sections 21, 22, 23, 24 and 25, secured together by the rods or bolts 26. These sections divide the casing into compartments in which are located pairs of intermeshing gears $a, a', b, b', c, c'$ and $d, d'$. The gears $a, b, c$ and $d$ are keyed to a shaft 27 extending through the casing in alinement with the motor shaft 18. On the outer end of the shaft 27 is a pulley 28 which may be geared by means of a belt 29 to any mechanism which it is desired to drive. The casing of the motor L is formed with three horizontal cylindrical valve chambers 30, 31 and 32, in which are adapted to reciprocate valve members 33, 34 and 35 connected by a yoke 36. The valve members 33 and 35 each comprises a valve stem and cylindrical sections $e, f, g, h$ and $i$ secured to or formed integral with the valve stem. The valve member 34 comprises likewise a valve stem and sections $e', f', g', h'$ and $i'$. The valve member 34 is extended through and beyond the yoke 36 into a valve chamber 37 formed in the upper part of the pump casing, and is provided in this chamber with a valve 38. The valve member 34 may be adjustably secured in the yoke 36 by means of a set screw 39. The valve members 33, 34 and 35 are preferably each provided with a longitudinal air passage 80 to permit the confined air in the valve chambers 30, 31 and 32 to be transferred from one end to the other of said chambers as the valve members are operated. The pump valve 38 is provided with a passage 81 for a similar purpose. The casing for the motor L is provided with vertically disposed chambers or compartments 40 and 41 located on opposite sides of the compartments containing the motor gear wheels. Communication between the compartment 40 and the gear chambers is controlled by the valve member 35 and communication between the compartment 41 and the gear chambers is likewise controlled by the valve member 33. The compartment 40 communicates through a pipe 42 with the pump P on one side of the pump gears, and the compartment 41 is in communication through a pipe 43 with the opposite side of the pump gears. Air domes 44 and 44' are connected by pipes 45 with the pump P and extend upward above the pump and motor casings. A circulating liquid 46, as for example water or oil, fills the pump and motor casings and is sufficient to partially fill the air domes 44 and 44'. The confined air above the liquid serves to maintain an elastic pressure on the liquid and prevents any sudden or excessive changes in the pressure of the liquid, and thereby prevents undue strain on the mechanism. Keyed to the end of the motor shaft 18 is a sleeve 47 which also extends over the end of the shaft 27. This sleeve carries an expansion ring or clutch member 44 of a friction clutch K, the other member 45 of said clutch being keyed to the shaft 27. Splined on the sleeve 47 so as to rotate therewith is an annular clutch operating member 48 movable longitudinally on said sleeve into position to engage projections on the expansion ring 44 and expand the latter into frictional contact with the member 45.

A lever 49 for operating the clutch K and the valve mechanism is pivoted at 50 and extends upwardly through a slot 51 formed in the yoke 36 and stem of the valve member 34. The lever 49 is formed with a ring 52 surrounding the collar 48 and provided with lugs engaging an annular recess 53 in the collar 48 for moving the latter longitudinally. A rod 54 is pivoted at one end to the lever 49 and its opposite end is connected by a pivot 55 to a disk 56 pivoted at 57 to a bracket 58 carried by the motor M. The pivot 55 is extended to form a handle 59 which is also adapted to engage cam extensions 60 and 61 formed on the switch lever 7 for operating the latter.

The operation will be understood from the following description: With the parts in the position shown the motor M is at rest, the supply of current being cut off from the rotor. If now the operator moves the operating handle 59 upward for example to rotate the disk 56 in a counterclockwise direction, the cam 60 will first be engaged by the handle 59 and the lever 7 rotated into position to bring the contacts 9 and 10 into engagement with the stationary contacts 13 and 14, and thereby connect the positive and negative mains with the conductors 5 and 6 respectively. The motor M is thus started and rotates the pump gears 19 and 20 for example in the direction indicated by the arrows in Fig. 4. The pump operates in a well understood manner to force the liquid from the right-hand side to the left-hand side of the pump gears. The liquid is therefore forced through the pipe 43 into the chamber 41 of the motor L. The valves at this time being in the position indicated in Fig. 3 the compartment 41 is in communication through the ports $a^2$, $b^2$, $c^2$, and $d^2$ with the gear compartments. The liquid being forced into these compartments at the right hand side of the gears (see Fig. 2) rotates the latter as indicated by the arrows. From the left hand side of the gear compartment the liquid flows through ports $a^3$, $b^3$, $c^3$, and $d^3$ and the valve chamber 32 into the compartment 40, and from thence through the pipe 42 to the intake side of the pump casing, thereby completing the circulation of the liquid. As the liquid at this time is distributed to the four gear chambers of the motor, the motor gears are operated at a comparatively slow speed, and apply correspondingly powerful torque to the shaft 27 for operating the driven mechanism. A continued movement of the hand lever 59 in a counterclockwise direction operates through the link 54 and lever 49 to move the valve mechanism to the left, and thereby move the valve sections $f$ into position to close the ports $a^2$, and $a^3$. The valve section $c'$ is at the same time moved into position to open communication from one side to the other of the first gear chamber through the ports $a^4$ and $a^5$ and valve chamber 31. The liquid from the pump will therefore be distributed to operate the remaining three sets of gears $b$, $b'$, $c$, $c'$ and $d$, $d'$, resulting in a corresponding increase in the speed of the driven shaft 27. The gears $a$ and $a'$ at this time merely cause a circulation of liquid in their own compartment. A further movement of the valve mechanism to the left will bring the valve sections $g$ into position to close the ports $b^2$ and $b^3$ cutting off the supply of fluid from the gears $b$ and $b'$, at the same time moving the valve section $f'$ into position to permit a local circulation of the liquid by the gears $b$ and $b'$. The liquid from the pump is now all directed to the two sets of gears $c$, $c'$ and $d$, $d'$ so that the initial speed is substantially doubled. A further movement of the valve mechanism to the left in like manner closes the ports $c^2$ and $c^3$ so that all the liquid is directed to the gears $d$ and $d'$, resulting in a corresponding increase in the speed. The motor L is now being operated at its highest driving speed. A further movement of the valve mechanism to the left moves the sections $i$ into position to entirely cut off the supply of liquid to the motor gears, and at the same time moves the valve section 38 in the pump P into position to permit a free local circulation of the liquid in the pump casing through the ports $k$ (see Fig. 4). During this final movement of the valve mechanism the sleeve 48 operates the clutch K to connect the sleeve 47 to the shaft 27 thereby forming a direct driving connection between the motor shaft 18 and the driven shaft 27. This operation of the clutch takes place during the gradual cutting off of the driving liquid from the last section of the motor L, a positive driving connection being effected through the clutch before the driving pump is entirely cut off from the fluid motor. The speed of the shaft 27 when the pump P is operating to drive the gears $d$ and $d'$ only is substantially the same as that of the motor shaft 18, so that there is no sudden or material change in the speed of the shaft 27 when the clutch K is operated. If the operating handle 59 is moved back toward initial position the cycle of operations above described will be reversed, and gradually reduce the speed of the driven shaft. By moving the handle 59 to an intermediate position any desired speed may be maintained. If the handle 59 is moved downward from its initial position the switch lever will be operated to reverse the motor circuit and cause a reversal of the motor M, resulting in a reversal of the shaft 27. The operation of the clutch and valve mechanism is the same however when the operating handle 59 is moved in a clockwise direction as when moved in a counterclockwise direction.

I have herein shown a gear pump and gear motor because I have found from experience that gear mechanism of this kind when properly made can be operated with a high pressure and is adapted to operate efficiently at a high speed. The motion delivered by this mechanism is also very regular. It will be understood however that various other forms of fluid operated pumps and motors may be employed within the scope of this invention. The present invention is well adapted for use in operating large planers or lathes, boring mills, etc., but may also be used to advantage in the operation of elevators, automobile trucks, and numerous other mechanical devices. Various changes in the details of construction and arrangements of parts might obviously be made within the scope and spirit of the present invention. I wish therefore not to be limited to the particular construction and arrangement herein disclosed.

What I claim is new and desire to secure by Letters Patent of the United States, is:—

1. In a fluid operated motor, the combination with a casing formed with a series of gear chambers, gears in each of said chambers, ports communicating with each of said chambers on opposite sides of the gears, a separate passage for each gear chamber, said passages forming direct communication between opposite sides of said chambers, and valve mechanism operable to close the ports for said chambers successively, and open said passages as the corresponding said ports are closed.

2. The combination with a prime mover, of pumping mechanism connected thereto, a fluid motor comprising a plurality of compartments, and driving mechanism in said compartments, means for conveying fluid from the pumping mechanism to the motor, means for directing the fluid to a different number of said compartments at will, and means for reversing the prime mover and thereby reversing the fluid motor.

3. The combination with a pump, of a motor comprising a plurality of chambers, driving gears in each of said chambers, means for conveying liquid from the pump to said chambers for operating said gears, means for returning the liquid to the pump, and valves associated with each chamber, said valves being operable successively to cut off the supply of liquid to said chambers and simultaneously establish a local circulation of the liquid in the chambers.

4. The combination with a pump, of a motor comprising a plurality of chambers, driving gears in said chambers, means for conveying liquid from the pump to said chambers for operating said gears, means for returning the liquid from said chambers to the pump, valve mechanism operable to cut off the supply of liquid to said chambers successively and at the same time establish local paths for the circulation of liquid in the chambers, and means for establishing a local circulation of liquid in the pump when the supply of liquid is cut off from the motor.

5. The combination with a pump comprising a driving shaft, of a sectional fluid motor comprising a driven shaft in alinement with said driving shaft, means for conveying fluid from the pump and distributing it to the several sections of the motor, valve mechanism controlling the supply of fluid to the motor, a clutch between said shafts, and connections between said valve mechanism and clutch for controlling the order in which they are operated.

6. The combination with a prime mover, of a pump, a fluid motor, means for conveying liquid from the pump to the motor to operate the latter, valve mechanism controlling the circulation of liquid through the pump and motor, clutch mechanism for mechanically connecting the pump and motor, a controller for said prime mover, and mechanical connections between said controller, valve mechanism and clutch mechanism, for securing their operation in a predetermined order.

7. The combination with a prime mover, of a controller therefor, a pump connected to be driven by the prime mover, a fluid motor operable by fluid supplied from the pump, valve mechanism controlling the circulation of fluid, a driven member operated by the fluid motor, clutch mechanism operable to mechanically connect the prime mover with said driven member, and mechanical connections between said controller, valve mechanism, and clutch mechanism for controlling their order of operation.

8. The combination with a prime mover, of a pump, a casing comprising a plurality of compartments, a shaft extending through said compartments, gears in said compartments connected to drive said shaft, means for conveying liquid from the pump to said compartments for operating said gears, means for controlling the supply of liquid to said compartments, and clutch mechanism between said shaft and prime mover.

9. The combination with an electric motor, of a controller therefor, a pump connected to be driven by said motor, a liquid motor, means for conveying liquid between the pump and liquid motor, valve mechanism controlling the circulation of liquid, a driven member operated by the liquid motor, a clutch operative to directly connect said driven member to the electric motor, and mechanical connections between said controller, valve mechanism and clutch for securing their operation in a predetermined order.

10. The combination with a casing provided with a plurality of compartments, gears located in each of said compartments, a pressure chamber and an exhaust chamber, passages connecting each compartment with said chambers, a separate by-pass connecting the pressure and exhaust sides of each of said compartments, and valve mechanism operable to successively close the passages connecting the gear compartments with said chambers, and opening the by-pass for each gear compartment when it is cut off from said pressure and exhaust chambers.

11. In power transmission mechanism, the combination with a pump, of a motor, a valve mechanism controlling the circulation of liquid in the pump, piston-valves controlling the circulation of liquid in the motor, and means for mechanically connecting said valve mechanism and said piston valves for operation.

12. The combination with a pump and motor each comprising a valve chamber, a piston valve in each of said chambers, and mechanical connections between said valves.

13. The combination with a pump and a motor, of piston valves therefor, and rigid connections between said valves.

14. The combination with a sectional casing, of a plurality of parallel cylindrical valve chambers, a plurality of rigidly connected piston valves in each of said chambers and controlling the circulation of fluid within the sections of the casing, and means for connecting the valves in the several valve chambers for simultaneous movement.

15. The combination with a casing provided with a plurality of compartments and parallel valve chambers formed in the casing, of slide valves in each of said valve chambers and controlling the flow of fluid in said compartments, and means for mechanically connecting all of said valves for simultaneous movement.

16. The combination with a casing provided with a plurality of compartments, and a plurality of valve chambers, of passages connecting each of said valve chambers to each of said compartments, a valve member in one of said chambers operable from an initial position to successively close the passages communicating with its valve chamber, a valve member in another of said chambers initially closing the passages leading from its valve chamber and operable to successively open said passages, and means for operating said valve members.

17. The combination with a pump, of a fluid motor, piston valves in the pump and motor and controlling the circulation of liquid in the pump and motor, and mechanical connections between said valves to effect their simultaneous operation.

18. The combination with a fluid motor, of parallel cylindrical valve chambers therefor, piston valves in said chambers, a pump, a valve chamber therefor in alinement with one of said first named valve chambers, a piston valve in said pump valve chamber, and a valve stem connecting the pump valve with one of the motor valves.

19. The combination with a pump, of a sectional fluid motor provided with ports permitting the circulation of liquid through the pump sections in parallel, means for conveying the liquid between the motor and pump, piston valves movable longitudinally into positions to cut off the circulation of liquid through the motor sections successively, a passage permitting a local circulation of liquid within the pump, a piston valve normally closing said passage and connections between the motor valves and said last named valve for moving the latter to open position when the circulation through the motor sections is cut off.

20. The combination with an electric motor, of a pump connected to the motor, a fluid operated motor, means for circulating a liquid from the pump through the motor, and means for reversing the current through the electric motor and thereby reversing the direction of the electric motor, pump and fluid motor.

21. The combination with a pump comprising intermeshing gears and a drive shaft secured to one of said gears, of a sectional liquid motor, each section of which comprises intermeshing gears, a driven shaft in alinement with the drive shaft and having a gear of each of said sections secured thereto, means for circulating a liquid from the pump through the motor sections in parallel, valve mechanism for cutting off the circulation through the motor sections successively and thereby accelerating the driven shaft to substantially the same speed as the drive shaft, and clutch mechanism for connecting said shafts when they have been brought to the same speed.

22. In a fluid motor, the combination with a plurality of sections, of fluid circulating means within each section, a supply chamber, a discharge chamber, ports connecting each of said sections with both of said chambers, a port associated with each of said sections to permit a local circulation of fluid when the port is open, valves controlling all of said ports, operating mechanism connecting the valves, said valves being relatively positioned to cut off the circulation between said chambers and said sections in succession and to open the ports for local circulation of the liquid in each section simultaneously with the cutting off of said section from the said chambers.

In testimony whereof, I have signed my name to this specification in the presence of two subscribing witnesses.

AUGUST SUNDH.

Witnesses:
  JOHN F. RULE,
  JAMES G. BETHELL.